United States Patent [19]

Kent et al.

[11] Patent Number: 5,268,051
[45] Date of Patent: Dec. 7, 1993

[54] SELF-BONDING TAPES

[75] Inventors: Eric G. Kent, Forest; Kyosaku Sato, Sarnia, both of Canada

[73] Assignee: Polysar Rubber Corporation, Sarnia, Canada

[21] Appl. No.: 268,780

[22] Filed: Nov. 9, 1988

[51] Int. Cl.$^5$ .............................. B31C 13/00
[52] U.S. Cl. .................... 156/162; 156/334; 524/519; 524/521; 525/214; 525/212; 525/240
[58] Field of Search ............ 156/160, 162, 334; 525/214, 240

[56] References Cited

U.S. PATENT DOCUMENTS 4,713,133  12/1987  Kent .................... 156/162

FOREIGN PATENT DOCUMENTS 65741  4/1982  Japan .
65769  4/1982  Japan .

OTHER PUBLICATIONS

Abstract of Japanese Kokai 81-13608—Chemical Abstracts vol. 95, 1981 No. 4453v "Self-Adhering Dielectric Adhesive Tapes for Electric Cables".
Abstract of Japanese Kokai 82-65769—Chemical Abstracts vol. 97, 1982 No. 111146z "Electric Field-Attenuating Adhesive Tapes".
Abstract of Japanese Kokai 82-65741—Chemical Abstracts vol. 97, 1982 No. 111148b "Electric Field Relaxation Compositions".

Primary Examiner—John C. Bleutge
Assistant Examiner—Mark Sweet
Attorney, Agent, or Firm—Stevens, Davis, Miller & Mosher

[57] ABSTRACT

Novel, uncured tapes are provided comprising a raw polymer mixture of HDPE, LLDPE or isotactic polypropylene, chlorosulfonated polyethylene rubber, a small amount of a filler or pigment and, optionally, a minor proportion of chlorinated polyethylene rubber or an elastomeric polymer. They are self-bonding when elongated at least about 50% and wrapped on a substrate, and possess various degrees of flame resistance depending on their composition.

11 Claims, No Drawings

SELF-BONDING TAPES

FIELD OF THE INVENTION

This invention relates to tapes which are non-tacky in their relaxed state but whose overlapping layers self-bond when stretched and wrapped on a substrate.

BACKGROUND OF THE INVENTION

Many articles are coated for protection from the environment in a variety of ways including the application of a thin sheet or tape in a wrapping operation. In pipe wrapping operations, a separate adhesive layer is generally used to achieve adhesion to the substrate and of the overlapping layers to each other. In electrical applications such as cable splicing, the tape is wrapped, usually spirally, around an electric cable. Earlier such tapes were based on natural rubber whereas later tapes described in the literature are based on isobutylene polymers combined with various other synthetic polymers. More recently the literature describes self-bonding tapes made from compounds containing chlorosulfonated and chlorinated polyethylene and various compounding ingredients such as fillers, plasticizers and tackifiers, in abstracts of Japanese patent applications by Showa Electric Wire KK identified as Kokai 81-13608, Kokai 82-65741 and Kokai 82-65769. Generally these tapes are tacky in the relaxed state rendering them difficult to handle and, when formed into a roll or liner adhere together or fuse rendering them impossible to unwind after a short time. To avoid this problem, self-adhering tapes have been provided with a removable liner between overlapping layers. Removal of the liner is time consuming and may be difficult when it becomes tightly adhered to the tape.

DISCLOSURE AND PRACTICE OF INVENTION

The present invention is based on the discovery that tapes which are not tacky in the relaxed state but which are self-bonding when stretched and wrapped around a substrate, can be produced using uncured or raw polymer mixtures consisting of certain thermoplastic α-olefin polymers mixed in specific proportions with chlorosulfonated polyethylene rubber. The mixture may also contain certain proportions of chlorinated polyethylene rubber and an elastomeric polymer such as isobutylene-isoprene rubber, polyisobutylene or ethylene propylene rubber. The tapes also contain a filler or pigment such as carbon black or titanium dioxide. They are strong but can be readily stretched without breaking and are readily handleable over a wide temperature range, have good ozone resistance and improved flame resistance. The α-olefin polymers may be those polyethylenes which are generally referred to as low pressure polyethylene or isotactic polypropylene.

According to our discovery, there is provided a tape and a process for affixing to a substrate a tape having insufficient tack to self-bond in the relaxed state and comprising a raw polymer mixture of (all parts being parts by weight), (a) from about 30 to 90 parts of chlorosulfonated polyethylene rubber;
(b) from about 10 to 25 parts of a thermoplastic polymer selected from the group consisting of (i) a polymer of ethylene having a density of from about 0.945 to about 0.965 gm/cm$^3$ (ii) a linear low density polymer of ethylene having a density of from about 0.91 to about 0.94 gm/cm$^3$, and (iii) isotactic polypropylene;
(c) from 0 to about 30 parts of chlorinated polyethylene rubber;
(d) from 0 to about 30 parts of elastomeric polymer selected from the group consisting of (i) isobutylene-isoprene polymer, (ii) homopolymer of isobutylene having a Staudinger molecular weight from about 30,000 to about 100,000, and (iii) a polymer of ethylene and propylene containing from about 50 to about 65 percent by weight of ethylene for a total of 100 parts of (a), (b), (c) and (d); and
(e) from about 0.5 to about 20 parts per 100 parts of (a), (b), (c) and (d) of one or more filler or pigment,
provided that the proportions of components (b) and (c) in said mixture are such that b+0.5 c does not exceed about 30 when (b) is polyethylene and does not exceed about 20 when (b) is polypropylene, wherein said tape is subjected to a stretching elongation of at least about 50% immediately prior to contact with the substrate, and the elongated tape is applied to the substrate in a wrapping operation whereby the overlapping layers of said tape self-bond to each other.

Chlorosulfonated polyethylene rubbers are well known in the industry as polyethylene which has been chemically modified to contain from about 25 to about 50, and preferably for use in this invention from about 35 to 45, weight percent chlorine and from about 0.9 to about 1.4, and preferably for use in this invention from about 0.9 to about 1.1, weight percent sulphur. The polymer is a solid having a molecular weight, expressed as Mooney viscosity, of from about 30 to about 80 (ML-4 at 100° C.), and preferably from about 35 to about 55.

Chlorinated polyethylene rubbers are well known in the industry as polyethylene which has been chemically modified to contain from about 25 to about 50 weight percent chlorine. In the present invention it is preferable to use those polymers containing from about 30 to 45 weight percent chlorine. The polymer is a solid having a molecular weight, expressed as Mooney viscosity, of from about 30 to about 80 (ML-4 at 100° C.).

Polyethylene is a well-known article of commerce and a large number of grades are available. The older grades are produced by a high pressure process which operates at a pressure of from about 15,000 to 50,000 psi. The products produced in this process contain a mixture of short and long chain branches. In the newer or low pressure process the polymer is produced either in gas phase fluidized bed reactors at pressures of about 100 to 300 psi or in liquid phase reactors. In these low pressure processes, the ethylene units polymerize in a linear fashion and randomly spaced short branches or side chains may be incorporated by copolymerizing small amounts, up to about 20 percent by weight, of α-olefins such as propylene, butene, hexene, octene and the like. The frequency and length of the side chains controls the density of the polymer. The low pressure processes are used in the production of products having densities ranging from about 0.91 to about 0.965 gm/cm$^3$. The term linear low density polyethylene (LLDPE) is commonly used, and when used herein is to be understood to mean the low pressure produced polymers having a density in the range from 0.91 to 0.94 gm/cm$^3$. The term high density polyethylene (HDPE) is commonly used, and is used herein to describe low pressure produced polyethylene having a density of from about 0.945 to about 0.965 gm/cm$^3$. Such polymers generally range in molecular weight from about 100,000 to 500,000 with those in the range from about 100,000 to 300,000 being preferred. These polymers produced in the low pressure process have been found to be useful in the practice of the invention. They are available commercially in grades covering a range of melt flow index, which is a measure of the viscosity under melt flow conditions. Those preferred in the practice of the present invention have a melt flow index which falls within the range from about 0.2 to about 5 according to ASTM-D-1238.

The polypropylene which can be used in the practice of the present invention is preferably highly crystalline in which propylene is polymerized predominantly in the isotactic configuration. It may also contain a small proportion, up to about 15 percent by weight, of the atactic configuration or of another copolymerized α-olefin such as butene, pentene, hexene, octene and the like. The term polypropylene is used herein to include homopolymers of propylene as well as such copolymers. A large number of grades of polypropylene are available commercially covering a wide range of melt flow index. The grades having a melt flow index according to ASTM-D-1238 of from about 2 to about 12 are preferred.

The isobutylene-isoprene polymer may be selected from a polymer containing from about 97 to about 99.5 weight percent of isobutylene and from about 0.5 to about 3 weight percent of isoprene or from a polymer containing from about 0.5 to about 1.5 weight percent of chlorine or from about 1.5 to about 2.5 weight percent of bromine and from about 95 to about 99 weight percent of isobutylene and from about 0.5 to about 3 weight percent of isoprene. Such polymers are commercially available and have a molecular weight, expressed as the Mooney viscosity, of from about 30 to about 80 (ML 1+8 at 100° C.).

Homopolymers of isobutylene are available commercially in a range of products having various molecular weights. It is prepared using Friedel-Crafts catalysts at low temperature and its manufacture is well known in the art. The polyisobutylene preferred in the raw polymer mixture of this invention has a Staudinger molecular weight of from about 50,000 to about 100,000, especially from about 60,000 to about 80,000. Grades having higher molecular weights particularly if used in amounts at the higher levels of the range described herein result in tapes which are difficult to stretch and which do not self-bond as well as the lower molecular weight grades when stretched and wrapped. On the other hand, very low molecular weight grades result in tapes which are tacky and difficult to handle.

Elastomeric polymers of ethylene and propylene are well known to those skilled in the art and a variety are available commercially. Suitable such polymers include EPR (ethylene-propylene rubber) and EPDM (ethylene-propylene-terpolymer) containing by weight from about 50 percent to about 65 percent ethylene. The third monomer which is used in a small amount in the production of EPDM is a copolymerizable polyene. Those which are generally used commercially are non-conjugated dienes including 5-ethylidene-2-norbornene, 1,4-hexadiene and cyclic dienes such as dicyclopentadiene.

To produce tapes having the desired combination of properties, the relative proportions of the components in the raw polymer mixture fall within certain specific ranges, expressed in parts per 100 of total polymer in the mixture. For suitable flame resistance the proportion of elastomeric polymer should not exceed about 30 parts and preferably should not exceed about 20 parts by weight. Although the elastomeric polymer is not essential, a small amount improves processability of the mixture, with the preferred range being from about 10 to about 20 parts. The proportion of chlorinated polyethylene rubber which may be used is from 0 to about 30 parts and preferably from 0 to about 25 parts. Tapes with more than about 30 parts do not have suitable stretched tack. In the absence of chlorinated polyethylene rubber the proportion of thermoplastic polymer is from about 10 to about 25 and preferably from about 10 to 20 parts. At a level below about 10 parts, the tapes have an undesirable level of unstretched tack, and above about 25 parts they lack suitable self-bonding characteristics when stretched and wrapped.

However, when chlorinated polyethylene rubber is present in the mixture in significant proportions the maximum proportion of thermoplastic polymer that may be used is reduced. This appears to be because, although chlorinated polyethylene rubber contributes to the flame resistance properties of the tapes, it also tends to reduce the self-bonding of the stretched wrapped tapes. We have found that to achieve the desired balance of properties, the relative proportions of chlorinated polyethylene rubber and thermoplastic polymer must be selected from within the above specific ranges such that the sum of parts of thermoplastic polymer plus one-half the parts of chlorinated polyethene rubber does not exceed about 30 when the thermoplastic polymer is polyethylene or about 20 when the thermoplastic polymer is polypropylene.

Filler or pigment is included in the flexible layer in an amount up to about 20 parts by weight, based on 100 parts of total polymers and may be selected from those generally used in rubber compounds, exemplified by carbon black, calcium carbonate, talc, aluminum powder, titanium oxide, zinc oxide and mixtures thereof. The amount of a particular filler or pigment which can be used without adversely affecting the tensile and/or fusion properties of the flexible layer can be readily determined by those skilled in the art. It has surprisingly been found that carbon black and pigments, when present in the range from 5 to about 20 parts by weight, actually increase the rate of fusion of overlapping layers of stretched wrapped sheets or tapes. It has also been found that these ingredients are necessary to produce tapes which are resistant to softening when exposed to heat. To achieve this effect it is preferred to use titanium oxide or carbon black with the latter being particularly effective, the preferred carbon black being a high abrasion or super abrasion furnace black.

In order to enhance the flame resistance properties of some of the compositions used in producing the tapes of the invention, conventional fire retardant additives may be included. Examples of such compounds are antimony trioxide and aluminum hydroxide which are typically used in amounts from 1 to 10 parts by weight per 100 parts of total polymer.

Other optional ingredients may be incorporated into the flexible layer to achieve various performance objectives. For example, there can be added antioxidants and stabilizers, processing aids, and lubricants. The use of a separate tackifier is not required.

The tape is prepared by mixing procedures well known in the art of processing of synthetic rubbers using either a two roll mill or an internal mixer. When using a two roll mill, the thermoplastic polymer is added to the mill which has been preheated to a suitable temperature generally in the range of about 150° to about 170° C. and mixed until it fluxes and forms a band on the mill rolls, which usually takes about two minutes. The elastomeric polymer(s) and any additives are then added to the mill and the mixing continued until a uniform blend is obtained, which usually takes a further five minutes. The mixture is taken off the mill as strips of compound. Compound may also be produced in bulk form using an internal mixer by adding the polymers in any order to a preheated mixer and mixing until a uniform compound is obtained, usually about five minutes. Sheets may be prepared such as by passing the compound through a calendar or an extruder equipped with a sheet die. The thickness of the sheets is not critical but generally is from about 0.1 to about 5 mm. For most applications a thickness of from about 0.3 to about 3 mm is preferred. Tapes are produced by cutting the sheet to form tapes having the desired width.

The tape is applied to the substrate by subjecting it to a stretching elongation and in the elongated state applying it to the substrate, as for example in a wrapping action. Such stretching results in the tapes developing the ability to self-bond and the overlapping layers adhere strongly to each other. With some compositions these layers have the appearance of a fused sheet on or covering the substrate within a few hours of application. In other compositions the wrapped, overlapped layers do not fuse but require the application of a strong force such as pulling by hand in order to be separated or unwrapped. In order to develop the self-bonding properties required, the tape is elongated by at least about 50%. The upper limit of elongation depends on the composition of the particular sheet or tape and must be below the level which would cause rupture. We have found that an elongation of from about 75% to about 150% provides an optimum balance between developing self-bonding properties and avoiding rupture.

The tapes of our invention may be used in a wide variety of applications such as splicing, encapsulation and connection. Metal parts can be readily covered with such a tape for storage or environmental reasons; for example a metal pylon may be so covered to protect it when immersed in water. Minor repairs may be made to existing covers of exposed parts, for example underneath cars, trucks or other like vehicles. Damaged boots on tie rod ends or rack and pinion steering components may be readily repaired by covering with a tape in accordance with this invention. The process may be used, particularly in the form of tapes, in the electrical trade for splicing cables, and for repairing splices and damaged insulation.

These tapes may be used to particular advantage where flame resistance is required. The burning rate of the tapes varies depending on the composition, and by suitable selection of the composition tapes can be produced which do not burn.

The following examples illustrate the scope of our invention:

EXAMPLE 1

Sixty grams of each of five compounds of chlorosulfonated polyethylene rubber with three different thermoplastic polymers were prepared in a laboratory sized internal mixer in the relative proportions shown in Table 1 (parts by weight). The mixer was preheated to about 160° C. and the polymers were added and mixed for about 5 minutes. The compound was then formed into sheet form with a thickness of about 1.5 mm by pressing in a micro mold for about 2 minutes at a temperature of about 160° C. Tapes having a width of about 0.6 cm were then cut from the sheet. They were examined for unstretched tack by folding a portion back on itself and observing whether the overlapping layers stuck together. They were elongated by about 75 to 100%, wrapped around a wooden dowel and the degree of self-bonding observed after standing overnight. Flame resistance was determined by suspending vertically a tape about one inch wide by 2.5 inches long about one inch above the flame of a bunsen burner for 3 seconds, removing the burner and measuring the time until the tape stopped burning. A burn time of 0 seconds indicates a tape which did not ignite and could be referred to as self extinguishing. The results of the examination and tests are included in Table 1.

TABLE 1

|  | Compound (Tape) No. | | | | |
| --- | --- | --- | --- | --- | --- |
|  | 1 | 2 | 3 | 4 | Control 5 |
| HYPALON 40 | 80 | 85 | 90 | 60 | 85 |
| Butyl Rubber | — | — | — | 15 | 10 |
| HDPE 80060 | 20 | — | — | 25 | — |
| PROFAX 6524 | — | 15 | — | — | 5 |
| DOWLEX 2045 | — | — | 10 | — | — |
| Carbon Black | 10 | 10 | 10 | 3 | 10 |
| Antioxidant | 0.05 | 0.05 | 0.05 | 0.05 | 0.05 |
| Unstretched Tack | slight | slight | slight | nil | moderate |
| Self-bonding | strong | strong | strong | strong | strong |
| Fusion | partial | yes | yes | yes | yes |
| Burn Time (secs.) | 0 | 123 | 53 | — | 36 |

NOTES:
HYPALON 40 - chlorosulfonated polyethylene supplied by DuPont, containing about 35 weight percent chlorine and about one weight percent sulphur and having a Mooney viscosity of 55.
Butyl Rubber - POLYSAR Butyl 301 supplied by Polysar Limited and containing about 98.4 weight percent of isobutylene and about 1.6 weight percent of isoprene and having a Mooney viscosity (ML 1 + 12 at 125° C.) of about 55.
HDPE 80060 - high density polyethylene supplied by Dow Chemical and having a density of about 0.96 gm/cm$^3$.
PROFAX 6524 - isotatic polypropylene supplied by Hercules.
DOWLEX 2045 - linear low density polyethylene supplied by Dow Chemical and having a density of about 0.92 gm/cm$^3$.
Carbon Black - N330 type
Antioxidant - IRGANOX 1010.

It is noted that tapes 1 to 4 had either nil or slight unstretched tack. Tape 5 which is outside the scope of the invention because of the low level of polypropylene had moderate unstretched tack which resulted in overlapping layers sticking together on standing. When stretched and wrapped all the tapes self-bonded strongly and after standing overnight the overlapping layers of all except tape 1 appeared to have fused. Only the inner layers of tape 1 appeared to have fused, but the outer layers adhered strongly to each other and required significant force to unwrap.

EXAMPLE 2

Using the procedures of Example 1, the compounds shown in Table 2 were prepared and evaluated. The chlorinated polyethylene rubber was CPE 0342 supplied by Dow Chemical. It contained about 42 weight percent chlorine and had a Mooney viscosity of about 80 (ML-4 at 120° C.). The other ingredients were the same as used in Example 1.

TABLE 2

| | Compound (Tape) No. | | |
|---|---|---|---|
| | 6 | 7 | Control 8 |
| HYPALON 40 | 65 | 59 | 65 |
| CPE 0342 | 20 | 29 | 20 |
| HDPE 80060 | 15 | 12 | — |
| PROFAX 6524 | — | — | 15 |
| Carbon Black | 10 | 10 | 10 |
| Antioxidant | 0.05 | 0.05 | 0.05 |
| Unstretched Tack | nil | moderate | nil |
| Self-bonding | Strong | Strong | nil |
| Fusion | Partial | no | no |
| Burn Time (secs.) | 102 | 83 | 69 |

It is noted that tape 6 performed well in accordance with the objects of the invention in having nil unstretched tack but self-bonding strongly and partially fusing when stretched and wrapped. Tape 8, is outside the invention because the sum of the amount of polypropylene and one-half of the amount of CPE is too high at 25. The overlapping layers of Tape 7 did not fuse but self-bonded strongly.

EXAMPLE 3

Using the procedures of Example 1, the compounds shown in Table 3 were prepared and evaluated. The EPDM was EPDM 585, a copolymer of ethylene, propylene and ethylidene norbornene containing about 62% ethylene, and supplied by Polysar Limited. The other ingredients were the same as used in Examples 1 and 2.

TABLE 3

| | Compound (Tape) No. | | | |
|---|---|---|---|---|
| | 9 | 10 | 11 | 12 |
| HYPALON 40 | 55 | 55 | 55 | 40 |
| CPE 0345 | 25 | 25 | 25 | 30 |
| Butyl Rubber | 10 | 10 | — | 20 |
| EPDM | — | — | 10 | — |
| HDPE 80060 | — | — | — | 10 |
| DOWLEX 2045 | 10 | — | — | — |
| PROFAX 6524 | — | 10 | 10 | — |
| Carbon Black | 10 | 10 | 10 | 10 |
| Antioxidant | 0.05 | 0.05 | 0.05 | 0.05 |
| Unstretched Tack | Slight | Nil | Nil | Slight |
| Self-Bonding | Strong | Strong | Strong | Strong |
| Fusion | Yes | Partial | Partial | Yes |
| Burn Time (secs.) | 77 | 0 | 68 | 72 |

The results show variations in compositions of tapes which fulfill the objects of the invention.

EXAMPLE 4

Using the procedures of Example 1, the compounds shown in Table 4 were prepared and evaluated. The ingredients were the same as used in previous examples with compound 14 also containing 5 parts of two conventional flame retarding compounds, antimony trioxide and aluminum hydroxide.

TABLE 4

| | Compound (Tape) No. | | | |
|---|---|---|---|---|
| | 13 | 14 | 15 | Control 16 |
| HYPALON 40 | 30 | 30 | 30 | 20 |
| CPE 0345 | 20 | 20 | 20 | 30 |
| Butyl Rubber | 30 | 30 | 30 | 30 |
| HDPE 80060 | 20 | 20 | 20 | 20 |
| Antimony Trioxide | — | 5 | — | — |
| Aluminum Hydroxide | — | 5 | — | — |
| Carbon Black | — | — | 3 | 3 |
| Antioxidant | 0.05 | 0.05 | 0.05 | 0.05 |
| Unstretched Tack | Slight | Nil | Nil | Nil |
| Self-bonding | Strong | Strong | Strong | No |
| Fusion | Yes | Yes | Yes | No |
| Burn Time (secs.) | 117 | 0 | 87 | 102 |

These results show by comparing compounds 13, 14 and 15 that the addition of antimony trioxide and aluminum hydroxide contributes to flame resistance of these compounds. Tape 16 which is outside the scope of the invention because it contains only 20 parts of chlorosulfonated polyethylene did not self-bond.

What is claimed is:

1. The process of affixing to a substrate a tape having insufficient tack to self-bond in the relaxed state and comprising a raw polymer mixture of
   a) from about 30 to 90 parts by weight of chlorosulfonated polyethylene rubber;
   b) from about 10 to 25 parts by weight of a thermoplastic polymer selected from the group consisting of (i) a polymer of ethylene having a density of from about 0.945 to about 0.965 gm/cm$^3$, (ii) a linear low density polymer of ethylene having a density of from about 0.91 to about 0.94 gm/cm$^3$, and (iii) isotactic polypropylene;
   c) from 0 to about 30 parts by weight of chlorinated polyethylene rubber;
   d) from 0 to about 30 parts by weight of elastomeric polymer selected from the group consisting of (i) isobutylene-isoprene polymer, (ii) homopolymer of isobutylene having a Staudinger molecular weight from about 30,000 to about 100,000, and (iii) a polymer of ethylene and propylene containing from about 50 to 65 percent by weight of ethylene for a total of 100 parts by weight of a), b), c) and d); and
   e) from about 0.5 to about 20 parts by weight per 100 parts by weight of a), b), c) and d) of one or more filler or pigment, provided that the proportions of components b) and c) in said mixture are such that b+0.5 c does not exceed about 30 when b) is polyethylene and does not exceed about 20 when b) is polypropylene, wherein said tape is subjected to a stretching elongation of at least about 50% immediately prior to contact with the substrate, and the elongated tape is applied to the substrate in a wrapping operation whereby the overlapping layers of said tape self-bond to each other.

2. The process of claim 1 wherein (d) is an isobutylene-isoprene polymer selected from the group consisting of (a) a copolymer containing from about 97 to about 99.5 weight percent of isobutylene and from about 0.5 to about 3 weight percent of isoprene and (b) a copolymer containing from about 95 to about 99 weight percent of isobutylene, from about 0.5 to about 2 weight percent of isoprene and from about 0.5 to about 1.5 weight percent of chlorine or from about 1 to about 3 weight percent of bromine.

3. The process of claim 1 wherein (d) is a homopolymer of isobutylene having a Staudinger molecular weight from about 60,000 to about 80,000.

4. The process of claim 2 wherein said isobutylene isoprene polymer has a Mooney viscosity (ML 1+8 at 100° C.) of from about 30 to about 80.

5. The process of claim 1 wherein (d) is a copolymer of ethylene, propylene and ethylidene norbornene containing from about 50 to about 65 percent by weight of ethylene.

6. The process of affixing to a substrate a tape having insufficient tack to self-bond in the relaxed state and comprising a raw polymer mixture of,
   a) from about 30 to 90 parts by weight of chlorosulfonated polyethylene rubber;
   b) from about 10 to 25 parts by weight of a thermoplastic polymer selected from the group consisting of (i) a polymer of ethylene having a density of from about 0.945 to about 0.965 gm/cm$^3$, (ii) a linear low density polymer of ethylene having a density of from about 0.91 to about 0.94 gm/cm$^3$, and (iii) isotactic polypropylene;
   c) from 0 to about 30 parts by weight of chlorinated polyethylene rubber;
   d) from 0 to about 30 parts of elastomeric polymer selected from the group consisting of (i) isobutylene-isoprene polymer, (ii) homopolymer of isobutylene having a Staudinger molecular weight from about 30,000 to about 100,000, and (iii) a polymer of ethylene and propylene containing from about 50 to about 65 percent by weight of ethylene for a total of 100 parts by weight of a), b), c) and d); and
   e) from about 0.5 to about 20 parts by weight per 100 parts by weight of a), b), c) and d) of filler selected from titanium dioxide and carbon black,
provided that the proportions of components b) and c) in said mixture are such that b+0.5 c does not exceed about 30 when b) is polyethylene and does not exceed about 20 when b) is polypropylene, wherein said tape is subjected to a stretching elongation of at least about 50% immediately prior to contact with the substrate, and the elongated tape is applied to the substrate in a wrapping operation whereby the overlapping layers of said tape self-bond to each other.

7. The process of claim 6 wherein (d) is an isobutylene-isoprene polymer selected from the group consisting of (a) a copolymer containing from about 97 to about 99.5 weight percent isobutylene and from about 0.5 to about 3 weight percent isoprene and (b) a copolymer containing from about 95 to about 99 weight percent isobutylene, from about 0.5 to about 2 weight percent isoprene and from about 0.5 to about 1.5 weight percent of chlorine or from about 1 to about 3 weight percent bromine, said isobutylene-isoprene polymer having a Mooney viscosity (ML 1+8 at 100° C.) of from about 30 to about 80.

8. The process of claim 6 wherein the stretching elongation is from about 75 percent to about 150 percent.

9. The process of claim 6 wherein the proportion of elastomeric polymer (d) in said raw polymer mixture is from 10 to about 20 parts.

10. The process of claim 6 wherein said raw polymer mixture also contains from about 1 to about 10 parts of a flame retardant compound selected from aluminum hydroxide antimony pentoxide and mixtures thereof.

11. The process of affixing to a substrate a tape having insufficient tack to self-bond in the relaxed state and comprising a raw polymer mixture of
   a) from about 80 to about 90 parts by weight of chlorosulfonated polyethylene rubber;
   b) from about 10 to about 20 parts by weight of a thermoplastic polymer selected from the group consisting of (i) a polymer of ethylene having a density of from about 0.945 to about 0.965 gm/cm$^3$, and (iii) isotactic polypropylene; and
   c) from about 5 to about 20 parts by weight per 100 parts by weight of a) and b) of filler selected from titanium dioxide and carbon black,
wherein said tape is subjected to a stretching elongation of at least about 50% immediately prior to contact with the substrate, and the elongated tape is applied to the substrate in a wrapping operation whereby the overlapping layers of said tape self-bond to each other.

* * * * *